J. C. Butterworth,

Sash Holder.

No. 1,440. Reissued Mar. 24, 1863.

B. Fig: 4.

Witnesses:

Henry Earle

Arnold

Inventor:

J. C. Butterworth

AM. PHOTO-LITHO. CO. N.Y. (OSBORNE'S PROCESS.)

UNITED STATES PATENT OFFICE.

JAMES C. BUTTERWORTH, OF PROVIDENCE, RHODE ISLAND.

IMPROVEMENT IN SASH-FASTENERS.

Specification forming part of Letters Patent No. 1,039, dated April 16, 1861; Reissue No. 1,110, dated March 24, 1863.

*To all whom it may concern:*

Be it known that I, JAMES C. BUTTERWORTH, of Providence, in the county of Providence, in the State of Rhode Island, have invented a new and Improved Window-Sash Fastener and Supporter; and I do hereby declare that the following is a full and correct description thereof, reference being had to the accompanying drawings, and to the letters of reference marked thereon, the same letters in all the figures denoting the same parts.

Figure 1:
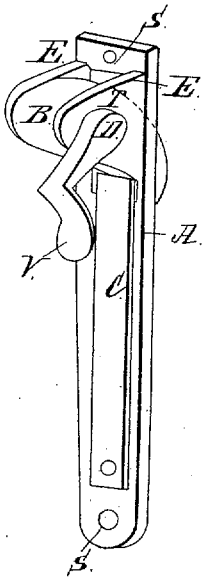
Figure 2:
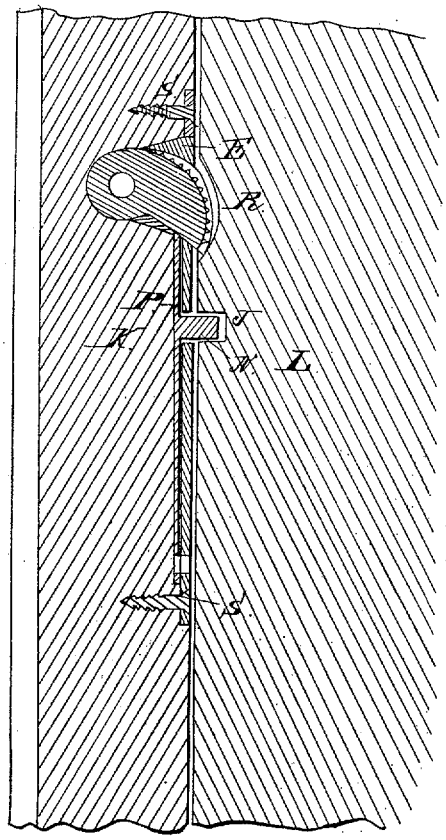
Figure 2:
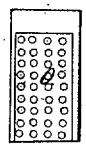
Figure 3:
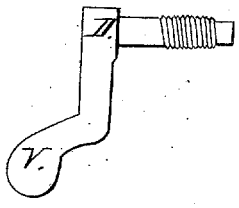

In these drawings, Figure 1 is a perspective view of the fastener. Fig. 2 is a section taken through the center of the same across the shaft of the cam, and showing parts of the sash and frame. Fig. 3 is a representation of the shaft and lever detached from the cam. Fig. 4 shows the face of the cam.

To construct my improved sash-fastener, make the plate A with two projections or standards, E E, at or near one end, and with a recess through the plate between them. A hole is made in each of the standards, at T, to receive the pivot or shaft of the cam B, which is placed between the standards E E, and which also projects through the recess in the plate. At the other end of this plate, upon the back of it, a spring, C, is attached, which extends upon the back of the plate far enough to allow its free end to rest upon the under side of the cam B. There is another recess, P, through the plate A a little below the one between the standards, to allow the stud N, which is attached to the spring C, to project through.

S S are holes at each end of the plate for the purpose of fastening it to the sash. (See Fig. 2.) The face of the cam B, or that part of it which projects through the plate A, is recessed, as seen in Figs. 2 and 4, *o*, to receive a piece of rubber packing or other semi-elastic material which projects a little above the face of the cam, or the rubber or other material may be attached directly to the face of the cam, but it is more difficult to keep it in place without the sides and ends of the recess to confine it. The object of this pad is to prevent the metal cam from wearing a place in the window-pane L, and to insure sufficient friction on the cam to sustain the sash when raised. This rubber or substance used in the recess of the cam is subjected to a great strain tending to rub it from its place, which makes it difficult to hold it upon the cam. To obviate this difficulty, I make the bottom of the recess or face of the cam full of small points projecting outward, either by making the proper points in the mold at the time of casting the cam or in some other suitable way. These points enter the rubber when it is subjected to the strain before mentioned, and prevent it from moving from its place. The greater the weight to be sustained the deeper the points will enter the rubber and the more firmly it will be held in place. In the place of the points creases or corrugations may be made for the same purpose, but they do not answer as well. The lever and shaft D of cam B are secured to it by having a screw thread cut upon the shaft and a corresponding one in the hole in the cam. This is to admit of the lever and shaft being easily removed, which may be done by turning the lever around in the opposite way to that by which the cam is operated. When this lever is removed, the sash will be securely locked against being opened from the outside by breaking the glass and operating the fastener, as is frequently done with the ordinary fasteners, and it will also prevent the sash from being raised or lowered by children and others at improper times.

The operation of the fastener is as follows: When it is desired to raise the sash, the lever V is raised, which turns the cam B back and presses the spring C back also, withdrawing the stud N from the recess J in the window-frame, when the sash will be free to move. When the sash is required to be held at any particular height, the lever V is released, when the spring C will push the cam B outward and cause it to press against the window-frame, and the friction of the rubber pad on the face of the cam against the frame causes the cam to turn out farther as the sash inclines to descend, until it presses the sash so hard against the window-frame on the opposite side as to create friction enough there to sustain the sash. When the sash is to be lowered by raising the lever V as before, the cam will be released or drawn back, and the sash free to move. When the sash is clear down, the cam B is pressed forward into a recess, R, made for it in the frame, (see Fig. 2,) which allows the stud N in the spring to come out far enough to catch in the recess J in the frame, which holds it down. In all other positions of the sash the face of the cam B projects far enough to prevent the stud N from touching the window-frame.

Having thus described my improved sash-fastener and sustainer, what I claim as my invention, and desire to secure by Letters Patent, is—

1. The combination of the friction-pad with the cam B, substantially as described, and for the purpose set forth.

2. The combination of the cam, recessed and furnished with the friction-pad, substantially as described, with the plate and spring, for the purposes herein set forth.

J. C. BUTTERWORTH.

Witnesses:

HENRY EARLE,
BENJAMIN ARNOLD.